Sept. 2, 1958 P. SEITZ 2,849,855
PIVOT BEARING WITH A REMOVABLE CAP PIECE
Filed June 20, 1955 2 Sheets-Sheet 1
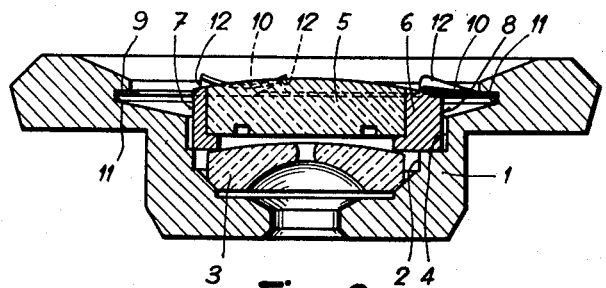
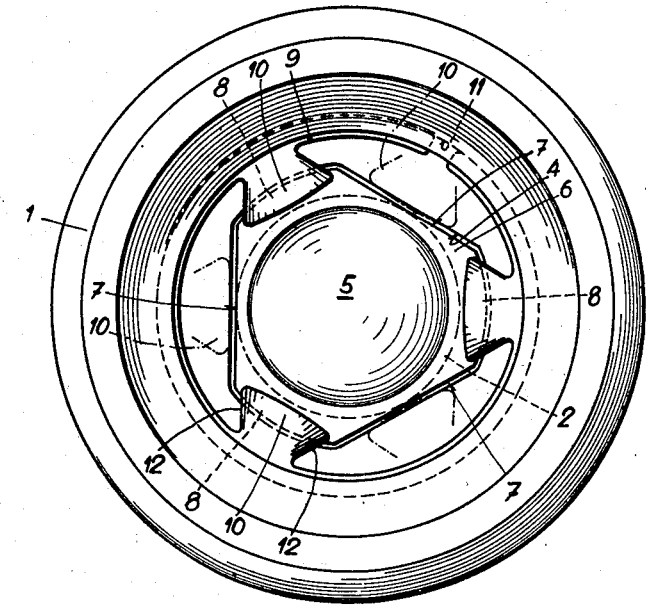
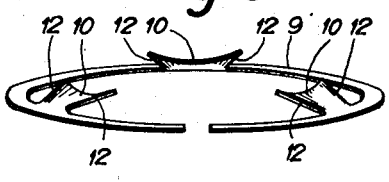
Inventor:
Pierre Seitz
by:
Michael S. Striker
agt.

Sept. 2, 1958 P. SEITZ 2,849,855
PIVOT BEARING WITH A REMOVABLE CAP PIECE
Filed June 20, 1955 2 Sheets-Sheet 2

Inventor:
Pierre Seitz
by:
Michael S. Striker
agt.

United States Patent Office 2,849,855
Patented Sept. 2, 1958

2,849,855

PIVOT BEARING WITH A REMOVABLE CAP PIECE

Pierre Seitz, Les Brenets, J. B., Switzerland

Application June 20, 1955, Serial No. 516,486

Claims priority, application Switzerland June 21, 1954

8 Claims. (Cl. 58—140)

This invention relates to pivot bearings with a removable cap piece in which this removable cap piece is yieldably maintained within a body member by a spring supported by the body member.

Such a bearing could for instance be either a shock-absorbing bearing for journalling the pivots of the balance-wheel staff of a timepiece, or a bearing with a fixed pierced member for journalling the pivots of any other movable element.

Cleaning a bearing of this type in particular the space of this bearing comprised between the pierced member and the cap piece, is an easy task as soon as the cap element is removably set in place within the body member.

In the bearings known in the art the cap piece is held or latched in place by a spring. However, the usual small sizes of time piece bearings involve a serious danger of losing the spring when assembling or disassembling the bearing.

More or less intricate constructions have already been provided in which the spring always remains attached to a part of the body member of the bearing and rocks around that part until it allows removing the cap piece from this body member. These constructions have, however, the drawback that the springs cannot be easily handled or manufactured, and such springs are moreover rather expensive because of their intricate form.

It is therefore an object of the invention to provide a latching spring which is simple and cheap, which remains on the body member of the bearing and which need not be subjected to any particular strengthening when assembling or disassembling the bearing.

The bearing according to the invention comprises means for preventing the cap piece from rotating around the axis of the body member once set therein and the cap piece is provided with at least two projections at its periphery. Furthermore, the spring consists of an opened resilient ring engaged in an annular groove of the body member so that it can freely turn around the axis thereof and this ring is provided with as many inner ears as there are projections around the cap piece. These ears are, of course, staggered around the ring in the same manner as the projections around the cap piece so that these ears may be set by rotation at will either over the projections of the cap piece so as to keep the latter axially in place within the body member or between these projections in order to enable disassembling the cap piece from the body member.

Two embodiments of the bearing according to the invention are represented diagrammatically and by way of example in the drawings annexed to this specification and forming part thereof.

In the drawings:

Fig. 1 is a diametrical cross-section of the first embodiment,

Fig. 2 is a plan view of the bearing of Fig. 1,

Fig. 3 is a perspective view of a detail of this bearing,

Figure 4:
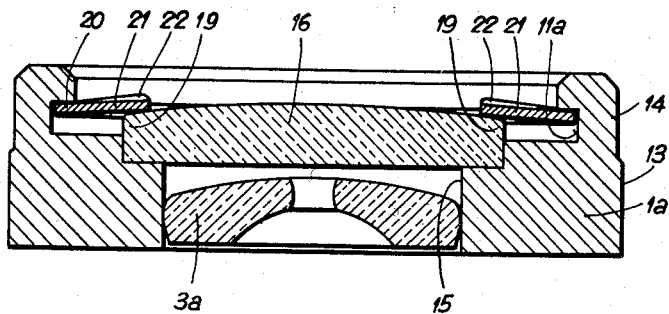
Fig. 4 is a diametrical cross-section of the second embodiment.

The bearing represented in Figs. 1 to 3 is a shock-absorbing bearing for a balance-wheel pivot of a timepiece. It comprises a body member 1 which is constituted by the end piece fixed to the cock of the timepiece. A first lodging 2 partly conical and partly cylindrical is provided in the member 1 for movably locating the pierced jewel 3 therein.

A second lodging 4 is provided in the member 1 for locating a cap piece constituted by a circular cap jewel 5 set within a metallic setting 6. The latter is made out of a circular ring at the periphery of which three flat portions 7 have been formed at regularly staggered places around the setting 6, so that the circular segments remaining between these flat portions form projections 8 of the setting 6.

As shown in Fig. 2, the form of the lodging 4 corresponds to that of the setting 6 with its peripheral projections 8, so that this setting with its peripheral projections 8 is held within the lodging 4 in a well determined angular position. It cannot therefore turn around the axis of the body member, once it is set therein.

The jewel 3 and the cap piece constituted by the cap jewel 3 with its setting 6 are held in place within their own lodgings by the spring represented in Fig. 3. This spring is constituted by an opened resilient ring 9 integral with three rigid internal ears 10. The ring 9 is introduced once for ever in an annular groove 11 provided in the member 1 by previously closing somewhat the ring, which is possible without any difficulty since this ring is opened.

The groove 11 is larger than the thickness of the annular ring 9 in order that the latter may turn freely around the axis of the body member when it is set in place as shown in Figs. 1 and 2. It will still be observed in Fig. 2 that the ears 10 of the spring are regularly staggered around the ring 9 like the projections 8 around the setting 6, so that these ears can be set over said projections in order to keep the setting 6 and the jewels 3 and 5 axially in place within their own lodgings.

In the position represented in full lines in Fig. 2, the jewels 3 and 5 are yieldably held in place within their lodgings rather by means of the ring 9 than by means of the ears 10 which are rigid, this ring 9 being somewhat distorted within the groove 11.

If turning the spring through 60° in either direction around the axis of the member 1, from the position shown in full lines in Fig. 1, the ears 10 come in the position represented in dot-and-dash lines in Fig. 2, in which they are situated now between the projections 8, opposite the flat portions 7. In that position the ears 10 entirely free the setting 6 of the cap jewel 5 while enabling to remove from the body 1, this jewel 5 as well as the pierced jewel 3. The contiguous faces of these jewels can thus be cleaned and the face of the cap jewel 5 turned towards the jewel 3 can be oiled again.

It has already been stated that the spring of Fig. 3 is set in place in the member 1 once for ever. It is, indeed, not necessary to remove it for disassembling the bearing.

The two lateral edges 12 of each ear 10 are bent upwards in order to render the passage of these ears over the projections 8 of setting 6 more easy when actuating the spring around the axis of member 1.

An undesirable rotation of that spring around said axis, when it is in its latching position, could be avoided by radial depressions which were provided in the upper face of the projections 8. The ears 10 of the spring would then enter these depressions and remain therein as by snap fit.

In the second embodiment (Figs. 4 and 5), the bearing also comprises a body member 1a. This member is cylindrical and it is provided with a portion 13 which is intended to be set with force fit within a corresponding boring of the base-plate or of a bridge either of a watch movement or of any other similar instrument. The portion 13 does not extend over the whole height of the member 1a, so that the upper part 14 thereof, provided with an annular groove 11a will not shrink up while forcing this member into a baseplate or bridge boring.

A pierced jewel 3a is set with force fit within a central bore 15 of member 1a and a cap jewel 16 is placed in a lodging 17 provided in the member 1a. Two flat portions 18 (Fig. 5) are formed at the periphery of the jewel 16, so that the two circular segments defined by these flat portions 18 constitute projections 19 of the jewel 16. As in the first embodiment, the form of the lodging 17 exactly corresponds to that of the jewel 16 with its peripheral projections 19, so that this jewel 16 cannot turn around the axis of member 1a once it is set in its lodging 17.

A spring 20 similar to that of the first embodiment is also set in a groove 11a of member 1a. This spring is, however, only provided with two diametrically opposite ears 21 which keep the jewel 16 axially in place within member 1a, when they are set over the projections 19 as shown in full lines in Fig. 5. If turning the spring 20 from that position around the axis of member 1a through 90° in either direction in order to bring the ears 21 in the position represented in dot-and-dash lines in Fig. 5, the ears 21 entirely free the jewel 16 which can then be removed from the member 1a, as in the first embodiment.

Figure 5:
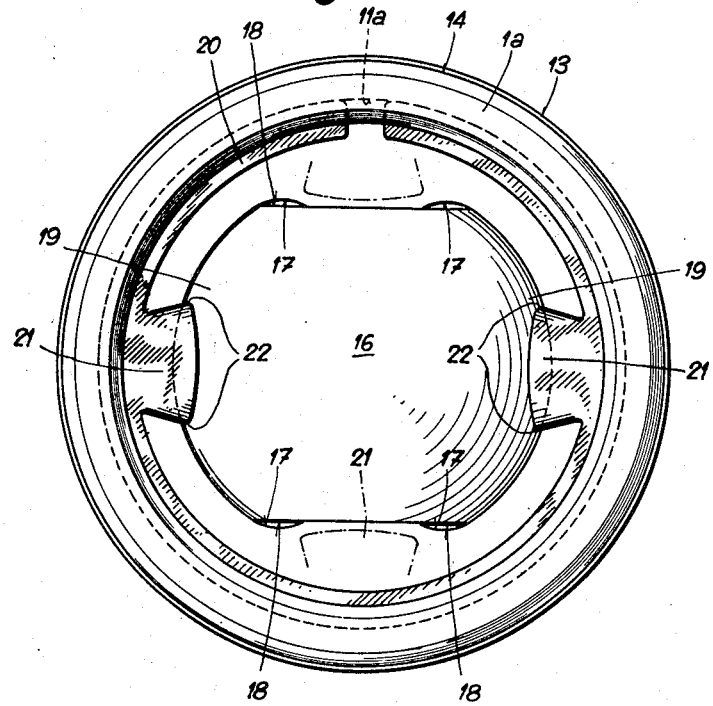
Fig. 5 is a plan view of the bearing of Fig. 4.

The lateral edges 22 of the ears 21 are here also bent upwards for rendering the passage of the ears 21 over the projections 19 more easy, when actuating for instance the spring from the position shown in dot-and-dash lines in Fig. 5 towards the position represented in full lines in that Fig. 5.

It will be understood that the pierced member and the cap piece of the bearing could just as well be metallic. Furthermore, the spring and the cap piece could be provided with more ears and projections, respectively, than two or three. These projections could also be formed otherwise, provided that the ears of the spring may be set by a mere rotation of the spring, at will, either over these projections for latching the cap piece in place, or between them, in order to free this cap piece from the body member of the bearing. In any case it would still be useful to prevent the cap piece from turning around the axis of the body member, for instance by means of a projection of this body member which would cooperate with two contiguous projections of the cap piece.

While different embodiments of the invention have been shown and described, various changes in the shape, size and arrangement of parts could obviously be resorted to without departing from the spirit of the invention or the scope of the subjoined claims.

I claim:

1. A pivot bearing comprising in combination a body member having an axis and provided with an annular groove, a cap piece in said body member, said cap piece having at least two projections at its periphery, holding means for preventing said cap piece from rotating about the axis of said body member when it is set therein, and a spring consisting of a resilient split ring made integral with internal ears, said split ring being located in said groove so that it may freely rotate therein around the axis of said body member, the number of said ears corresponding to that of said projections and said ears being staggered around said split ring in the same manner as said projections around said cap piece in order that they may be set by an appropriate rotation of said spring around the axis of said body member either over said projections, so that said spring, supported by said body member, bears upon said cap piece and maintains it yieldably within said body member in a predetermined axial position, or between said projections, thus allowing said cap piece to be removed from said body member.

2. The combination of claim 1, in which said holding means consist of a lodging provided in said body member, the form of said lodging corresponding to that of said cap piece with its peripheral projections.

3. The combination of claim 1, in which the edges of said ears are bent upwards, so that said ears may easily pass over the projections of said cap piece upon actuating said spring around the axis of said body member.

4. A pivot bearing comprising in combination a body member having an axis and provided with an annular groove, a circular cap piece in said body member having regularly staggered flat portions provided at its periphery so as to form at least two outward projecting circular segments between said flat portions, holding means for preventing said cap piece from rotating about the axis of said body member when it is set therein, and a spring consisting of a resilient split ring made integral with internal ears, said split ring being located in said groove so that it may freely rotate therein around the axis of said body member, the number of said ears corresponding to that of said circular segments of the cap piece, the spring thereby being turnable about the axis of said body member from a normal position in which said ears are engaged over said segments of the cap piece so that said spring, supported by said body member, bears upon said cap piece and maintains it yieldably within said body member in a predetermined axial position, into an angularly displaced position in which said ears are opposite said flat portions and allow said cap piece to be removed from said body member.

5. The combination of claim 4, in which the cap piece consists of a metallic setting and a circular jewel set with force fit within said setting, said flat portions being provided at the periphery of said setting.

6. The combination of claim 4, in which the whole cap piece consists of a jewel.

7. A pivot bearing, comprising, in combination, a body member having an axis and formed with a recess having in axial direction an inner portion, and an outer portion bounded by a radially extending inner flange; a resilient split ring having an outer peripheral portion mounted in said outer portion of said recess for turning movement about said axis, and having at least one projecting portion inwardly projecting in radial direction beyond said inner flange and being spaced a selected radial distance from said axis; a cap piece located in said recess of said body member with said axis passing therethrough and abutting in axial direction against said inner portion of said recess, said cap piece having at least one projecting portion radially projecting with respect to said axis a greater radial distance, and at least one recessed portion radially projecting with respect to said axis a smaller radial distance, said greater radial distance being greater, and said smaller radial distance being smaller than said selected radial distance, said projecting portion of said cap piece abutting in axial direction against said inwardly projecting portion of said split ring so that said peripheral portion of said split ring resiliently engages said inner flange; and holding means in said inner portion of said recess of said body member engaging said cap piece for preventing turning of said cap piece in said recess about said axis so that when said split ring is turned into a position in which said inwardly projecting portion thereof is located opposite said recessed portion of said cap piece, said cap piece does not turn with said split ring and can be removed in axial direction through said outer portion of said recess.

8. A pivot bearing, comprising, in combination, a body member having an axis and formed with a recess having in axial direction an inner portion, and an outer portion bounded by a radially extending inner flange; a resilient split ring having an outer peripheral portion mounted in said outer portion of said recess for turning movement about said axis, and having at least two projecting portions inwardly projecting in radial direction beyond said inner flange and being spaced a selected radial distance from said axis; a cap piece located in said recess of said body member with said axis passing therethrough and abutting in axial direction against said inner portion of said recess, said cap piece having at least two projecting portions radially projecting with respect to said axis a greater radial distance, and at least two recessed portions radially projecting with respect to said axis a smaller radial distance, said greater radial distance being greater, and said smaller radial distance being smaller than said selected radial distance, said projecting portions of said cap piece abutting in axial direction against said inwardly projecting portions of said split ring so that said peripheral portion of said split ring resiliently engages said inner flange; and holding means in said inner portion of said recess of said body member engaging said cap piece for preventing turning of said cap piece in said recess about said axis so that when said split ring is turned into a position in which said inwardly projecting portions thereof are located opposite said recessed portions of said cap piece, said cap piece does not turn with said split ring and can be removed in axial direction through said outer portion of said recess.

References Cited in the file of this patent

UNITED STATES PATENTS

| | | |
|---|---|---|
| 1,328,879 | Krueger | Jan. 27, 1920 |
| 2,239,682 | Marti | Apr. 28, 1941 |
| 2,596,449 | Van Haaften | May 13, 1952 |
| 2,746,239 | Vuilleumier | May 22, 1956 |

FOREIGN PATENTS

| | | |
|---|---|---|
| 286,918 | Switzerland | Mar. 2, 1953 |
| 301,023 | Switzerland | Nov. 1, 1954 |